US012723203B2

(12) United States Patent
Luo et al.

(10) Patent No.: US 12,723,203 B2
(45) Date of Patent: Sep. 1, 2026

(54) FLUIDIZED BED REACTOR SYSTEM FOR CATALYTIC CRACKING OF LIGHT HYDROCARBONS

(71) Applicant: Chevron U.S.A. Inc., San Ramon, CA (US)

(72) Inventors: Huping Luo, Moraga, CA (US); Xiaoying Ouyang, El Cerrito, CA (US); Christopher Declan Lane, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 182 days.

(21) Appl. No.: 18/826,721

(22) Filed: Sep. 6, 2024

(65) Prior Publication Data

US 2025/0163334 A1 May 22, 2025

Related U.S. Application Data

(60) Provisional application No. 63/601,829, filed on Nov. 22, 2023.

(51) Int. Cl.
*C10G 11/18* (2006.01)
*B01J 8/28* (2006.01)
*B01J 38/30* (2006.01)

(52) U.S. Cl.
CPC ............... *C10G 11/182* (2013.01); *B01J 8/28* (2013.01); *C10G 11/185* (2013.01); *B01J 38/30* (2013.01);
(Continued)

(58) Field of Classification Search
CPC ........................... C10G 11/18–185; B01J 8/28
See application file for complete search history.

(56) References Cited

U.S. PATENT DOCUMENTS 2,239,801 A 4/1941 Vanderreer
2,789,082 A 4/1957 Barr et al.
(Continued)

FOREIGN PATENT DOCUMENTS

WO WO-9808600 A1 * 3/1998 ............. C07C 5/333

OTHER PUBLICATIONS

PCT/US2024/045512, International Search Report, Dec. 9, 2024, 6 pages.

*Primary Examiner* — Renee Robinson
(74) *Attorney, Agent, or Firm* — Michael E. Carmen; Terrence M. Flaherty

(57) ABSTRACT

A fluidized bed reactor system including a fluidized bed reactor configured to receive a heated light hydrocarbon feed stream flowing upwards and a heated regenerated catalyst at a temperature sufficient to crack the heated light hydrocarbon feed stream to produce a product effluent stream containing hydrogen and spent catalyst having coke deposits, a catalyst regeneration unit operatively connected to a bottom portion of the fluidized bed reactor, the catalyst regeneration unit being configured to receive the spent catalyst flowing downwards and combust the coke deposits to produce the heated regenerated catalyst and a heated gas effluent for generating the heated light hydrocarbon feed stream, and a riser externally attached to the fluidized bed reactor and the catalyst regeneration unit, the riser being configured to receive the heated regenerated catalyst and a gas-based stream to flow the heated regenerated catalyst upwards to the fluidized bed reactor.

20 Claims, 2 Drawing Sheets

(52) U.S. Cl.
CPC ............... *B01J 2208/00371* (2013.01); *C10G 2300/1025* (2013.01); *C10G 2300/1081* (2013.01); *C10G 2300/703* (2013.01)

(56) References Cited

U.S. PATENT DOCUMENTS

| | | | | |
|---|---|---|---|---|
| 2,902,437 | A | 9/1959 | Rex | |
| 2,963,421 | A | 12/1960 | Luckenbah et al. | |
| 4,419,221 | A * | 12/1983 | Castagnos, Jr. ............ | B01J 8/28 208/159 |
| 2006/0161036 | A1* | 7/2006 | Beech, Jr. .................. | B01J 8/34 585/639 |
| 2022/0241746 | A1 | 8/2022 | Khawaji et al. | |

* cited by examiner

FLUIDIZED BED REACTOR SYSTEM FOR CATALYTIC CRACKING OF LIGHT HYDROCARBONS

PRIORITY CLAIM

The present application claims priority to U.S. Provisional Patent Application Ser. No. 63/601,829, entitled "Fluidized Bed Reactor System for Catalytic Cracking of Light Hydrocarbons," filed Nov. 22, 2023, the content of which is incorporated by reference herein in its entirety.

BACKGROUND

The ongoing search for alternatives to crude is increasingly driven by a number of factors. These include diminishing petroleum reserves, higher anticipated energy demands, and heightened concerns over greenhouse gas emissions from sources of non-renewable carbon. In view of its abundance in natural gas reserves, as well as in gas streams obtained from biological sources (biogas), natural gas has become the focus of a number of possible routes for providing liquid hydrocarbons. Natural gas occurs underground and is present as a gas when it comes out of the ground. Natural gas primarily consists of methane ($CH_4$), and additionally some flammable compounds such as ethane ($C_2H_6$) and propane ($C_3H_8$). Accordingly, converting light hydrocarbons such as methane to high value products such as hydrogen, olefins and aromatics has become an attractive option.

SUMMARY

In accordance with an illustrative embodiment, a continuous process comprises:

- receiving, in a top portion of a fluidized bed reactor, a first heated light hydrocarbon feed stream flowing upwards and a first heated regenerated catalyst at a temperature sufficient to crack the first heated light hydrocarbon feed stream to produce a first product effluent stream comprising hydrogen and spent catalyst comprising coke deposits,
- combusting, in a catalyst regeneration unit operatively connected to a bottom portion of the fluidized bed reactor, spent catalyst comprising the coke deposits to produce a second heated regenerated catalyst and a heated gas effluent,
- heating a light hydrocarbon feed stream with the heated gas effluent to produce a second heated light hydrocarbon feed stream, and
- flowing, in a riser externally connected to the catalyst regeneration unit and the fluidized bed reactor, the second heated regenerated catalyst from the catalyst regeneration unit with a gas-based stream to the top portion of the fluidized bed reactor to contact the second heated light hydrocarbon feed stream flowing upwards to produce a second product effluent stream comprising hydrogen and additional spent catalyst comprising coke deposits.

In accordance with another illustrative embodiment, a fluidized bed reactor system comprises:

- a fluidized bed reactor configured to receive a heated light hydrocarbon feed stream flowing upwards and a heated regenerated catalyst at a temperature sufficient to crack the heated light hydrocarbon feed stream to produce a product effluent stream comprising hydrogen and spent catalyst comprising coke deposits,
- a catalyst regeneration unit operatively connected to a bottom portion of the fluidized bed reactor, the catalyst regeneration unit being configured to receive the spent catalyst flowing downwards and combust the coke deposits to produce the heated regenerated catalyst and a heated gas effluent for generating the heated light hydrocarbon feed stream, and
- a riser externally attached to the fluidized bed reactor and the catalyst regeneration unit, the riser being configured to receive the heated regenerated catalyst and a gas-based stream to flow the heated regenerated catalyst upwards to the fluidized bed reactor.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated herein by way of example but not limitation. The principles illustrated in the example embodiments of the drawings can be applied to alternate processes and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements. In the accompanying drawings.

DETAILED DESCRIPTION

Figure 1:
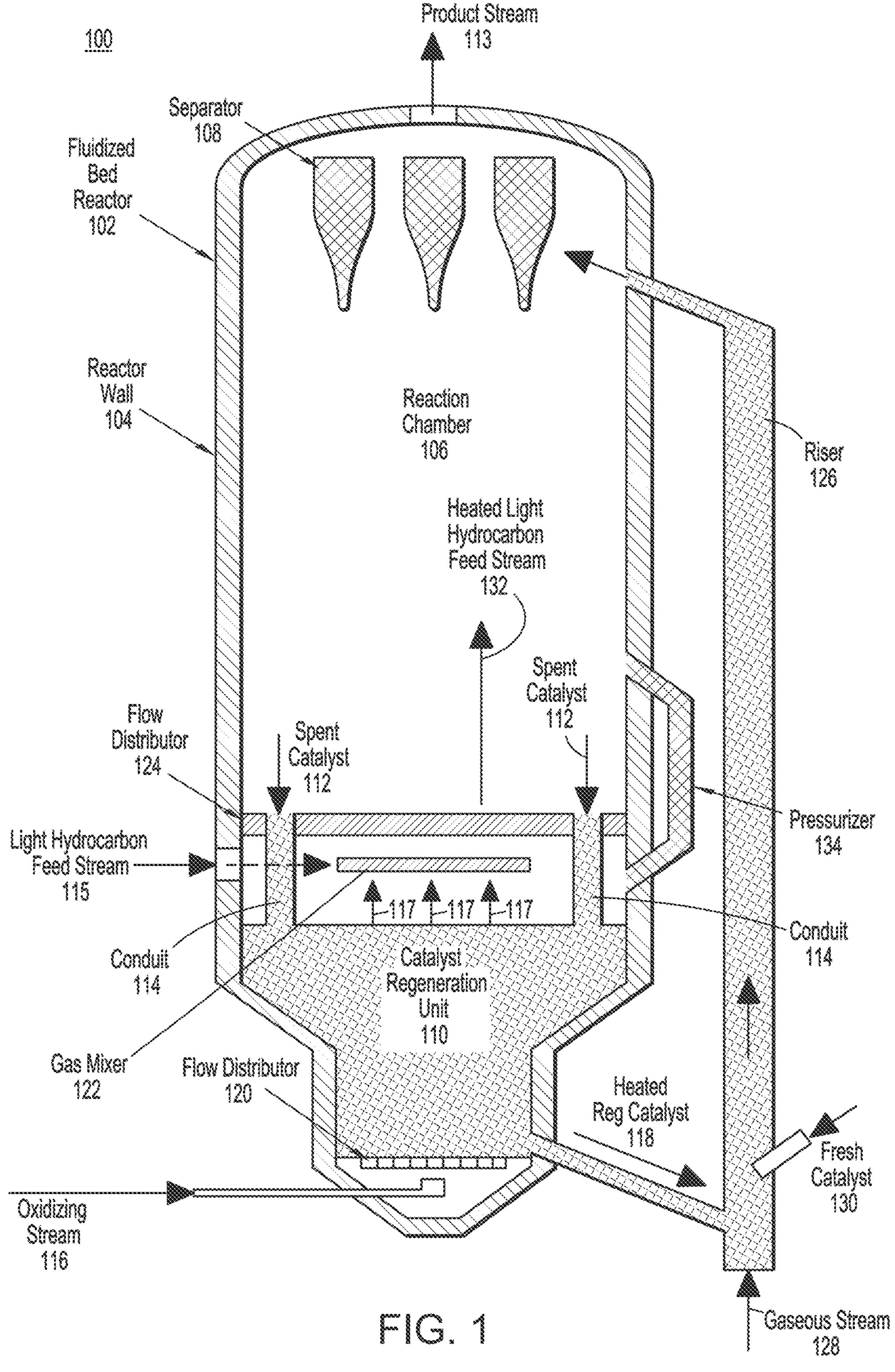
FIG. 1 illustrates a schematic diagram of a fluidized bed reactor system and process for catalytic cracking a heated light hydrocarbon feed stream to produce a product effluent stream comprising hydrogen and spent catalyst, according to an illustrative embodiment.

Various illustrative embodiments described herein are directed to fluidized bed reactor systems and processes for catalytic cracking of light hydrocarbons to produce a product effluent stream comprising hydrogen and spent catalyst. The conversion of light hydrocarbons into added value chemicals, materials and fuels offers one alternative to crude.

Direct conversion of light hydrocarbons such as methane can produce higher molecular weight hydrocarbons, such as olefins, alkynes and aromatics (e.g., benzene), as value-added chemicals and at the same time produce hydrogen that can be used to make, for example, fuel. Hydrogen is one of the more important options for future clean energy. However, the desired product selectivity obtained from the catalytic cracking process will depend on the particular type of catalyst as well as reaction condition. In addition, this reaction is highly endothermic and the exact value of the reaction heat will depend on the desired product distribution, such as enthalpy in the range of about 90 KJ/mol of $CH_4$. It is also an equilibrium limited reaction, and high temperatures are usually required to achieve a $CH_4$ conversion that would be practical for a commercial application. For example, to be commercially practical, maintaining a reactor at a temperature range of 600° C. to 1200° C. is required.

In addition to the costs associated with such a heat-intensive reaction, the required heat creates other practical challenges. For example, under such temperature conditions, the production of coke or solid carbon in the reactor becomes common, which can negatively affect the yield of valuable products, and can cause plugging of the reactor and catalyst deactivation. Such high temperatures also can require expensive materials for the reactor and can make design of the reactor challenging.

In view of these challenges, there is a need for solutions that produce hydrogen and value-added chemicals from light hydrocarbons in a cost-effective manner. In addition, it would be advantageous for the reactor design for this process to have the capability to (1) provide the reaction heat needed to maintain an optimized temperature profile to achieve high conversion, and (2) regenerate and recycle the catalyst being used. It would further be advantageous if such solutions are more energy efficient than existing approaches to produce hydrogen and value-added chemicals.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While systems and processes are described in terms of "comprising" various components or steps, the systems and processes can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

The term "continuous" as used herein shall be understood to mean a system that operates without interruption or cessation for a period of time, such as where reactant(s) and catalyst(s) are continually fed into a reaction zone and products are continually or regularly withdrawn without stopping the reaction in the reaction zone.

A "fresh catalyst" as used herein denotes a catalyst which has not previously been used in a catalytic process.

A "spent catalyst" as used herein denotes a catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, steam or hydrothermal deactivation, metals (and ash) sorption or accumulation, attrition, morphological changes including changes in pore sizes, cation or anion substitution, and/or chemical or compositional changes.

A "regenerated catalyst" as used herein denotes a catalyst that had become spent, as defined above, and was then subjected to a process that increased its activity to a level greater than it had as a spent catalyst. This may involve, for example, reversing transformations or removing contaminants outlined above as possible causes of reduced activity. The regenerated catalyst typically has an activity that is equal to or less than the fresh catalyst activity.

The term "primarily" shall be understood to mean an amount greater than 50%, e.g., 50.01 to 100%, or any range between, e.g., 51 to 95%, 75% to 90%, at least 60%, at least 70%, at least 80%, etc.

The non-limiting illustrative embodiments described herein overcome the drawbacks discussed above by providing fluidized bed reactor systems and processes for catalytic cracking a light hydrocarbon feed stream to, for example, a product stream comprising a $C_2$ to $C_{10}$ hydrocarbon product and hydrogen by utilizing at least a fluidized bed reactor, a catalyst regeneration unit and riser.

Figure 2:
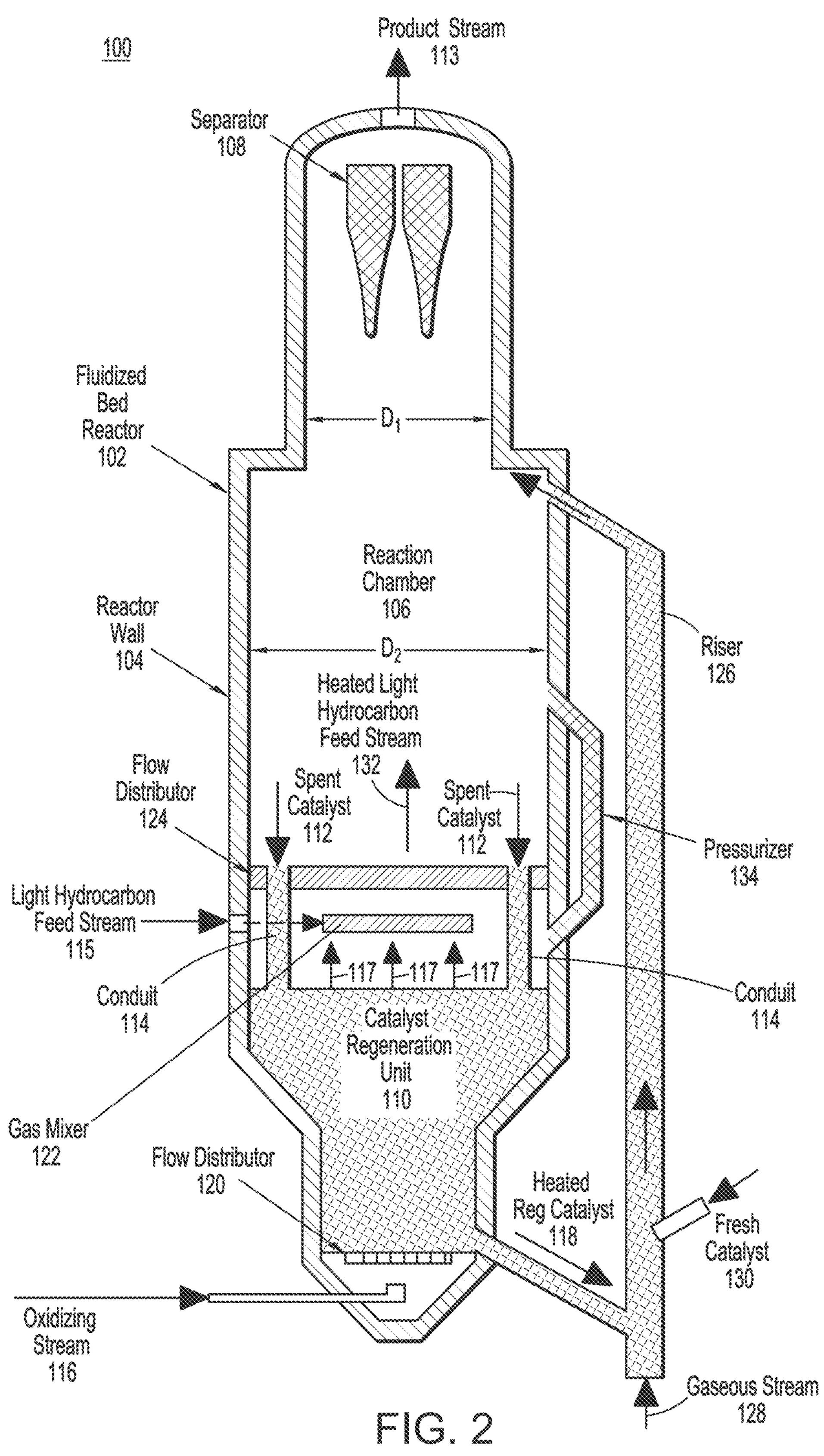
FIG. 2 illustrates a schematic diagram of a fluidized bed reactor system and process for catalytic cracking a heated light hydrocarbon feed stream to produce a product effluent stream comprising hydrogen and spent catalyst, according to an alternative illustrative embodiment.

The non-limiting illustrative embodiments of the present disclosure will be specifically described below with reference to the accompanying drawings. For the purpose of clarity, some steps leading up to the production of the product effluent stream comprising a $C_2$ to $C_{10}$ hydrocarbon product and hydrogen as well as spent catalyst as illustrated in FIGS. 1 and 2 may be omitted. In other words, one or more well-known processing steps which are not illustrated but are well-known to those of ordinary skill in the art have not been included in the figures. This is not intended to be interpreted as a limitation of any particular embodiment, or illustration, or scope of the claims.

General Process

The non-limiting illustrative embodiments described herein are directed to a continuous process for catalytic cracking a light hydrocarbon feed stream to produce a product effluent stream comprising a $C_2$ to $C_{10}$ hydrocarbon product and hydrogen as well as spent catalyst utilizing a fluidized bed reactor system. In non-limiting illustrative embodiments, the process involves receiving, in a top portion of a fluidized bed reactor, a heated light hydrocarbon feed stream flowing upwards and a first heated regenerated catalyst at a temperature sufficient to crack the heated light hydrocarbon feed stream and produce a product effluent stream comprising hydrogen and spent catalyst comprising coke deposits, combusting, in a catalyst regeneration unit operatively connected to a bottom portion of the fluidized bed reactor, spent catalyst comprising the coke deposits to produce a second heated regenerated catalyst and a heated gas effluent, heating a light hydrocarbon feed stream with the heated gas effluent to produce a second heated light hydrocarbon feed stream, and flowing, in a riser externally connected to the catalyst regeneration unit and the fluidized bed reactor, the second heated regenerated catalyst from the catalyst regeneration unit with a gas-based stream to the top portion of the fluidized bed reactor to contact the second heated light hydrocarbon feed stream to produce a second product effluent stream comprising hydrogen and additional spent catalyst comprising coke deposits.

The light hydrocarbon stream to be employed is not particularly limited and may include, for example, $C_1$ to $C_6$ or $C_1$ to $C_4$ or $C_1$ to $C_3$ or $C_1$ to $C_2$ alkanes such as methane, ethane, or natural gas either pure or in any suitable mixture. In some embodiments, the light hydrocarbon stream may also contain minor amounts of other ingredients including, for example, carbon dioxide, sulfur compounds such as $H_2S$, water, nitrogen, and mixtures thereof. In some embodiments the light hydrocarbon stream may also include steam, superheated steam, an inert gas such as nitrogen, or any mixture thereof. In some embodiments, the light hydrocarbon stream to be employed may include any suitable composition such that the resulting product includes at least hydrogen.

In some embodiments, the light hydrocarbon stream comprises methane or natural gas such as, for example, a light hydrocarbon stream comprising greater than about 80%, or greater than about 90%, or greater than about 95%, or greater than about 99% methane. As used herein, natural gas comprises methane and potentially higher alkanes, carbon dioxide, nitrogen or other gases, and/or sulfide compounds such as hydrogen sulfide, and mixtures thereof. In illustrative embodiments, the light hydrocarbon feed stream may further contain a portion of the produced products that are recycled back to the light hydrocarbon feed stream along with unreacted methane.

The produced product typically comprises a $C_2$ to $C_{10}$ hydrocarbon product and hydrogen. The $C_2$ to $C_{10}$ hydrocarbon product is not particularly limited and can be, for example, saturated, unsaturated, aromatic, or a mixture of such compounds. Examples of aromatic hydrocarbons include benzene, toluene, xylene, naphthalene, and methylnaphthalene. In some embodiments the $C_2$ to $C_{10}$ hydrocarbon product may comprise ethylene, propylene, acetylene, benzene, naphthalene, and various mixtures thereof depending upon the desired products and reactions used. In addition, as one skilled in the art will ready appreciate, the resulting $C_2$ to $C_{10}$ hydrocarbon product can be one of a liquid $C_2$ to $C_{10}$ hydrocarbon product or a solid $C_2$ to $C_{10}$ hydrocarbon product depending on the particular methane conversion process.

As will be discussed below, the light hydrocarbon feed stream can be pre-heated before being passed into the gas mixer of the fluidized bed reactor system and/or is heated from the combustion product of spent catalyst to generate a heated light hydrocarbon feed stream. The heated light hydrocarbon feed stream flows upwards to the fluidized bed reactor at a temperature sufficient to crack the heated light hydrocarbon feed stream in the presence of the heated regenerated catalyst to produce a product effluent stream comprising hydrogen and spent catalyst comprising coke deposits. Suitable reaction conditions may vary depending upon the reactants, desired products, catalysts, and equipment employed. In illustrative embodiments, a suitable temperature for the heated light hydrocarbon feed stream can be from about 500° C., or from about 700° C., and up to about 1000° C. or up to about 1200° C. In some embodiments, the reaction can take place at a pressure of from about 1 atmosphere up to about 3 atmospheres, or up to about 5 atmospheres, or up to about 10 atmospheres.

Catalyst

In an illustrative embodiment, as may be combined with one or more of the preceding paragraphs, the heated regenerated catalyst for the fluidized bed reactor is circulated through the unit in a continuous manner between catalytic cracking reaction and regeneration while continuously maintaining the regenerated catalyst in the fluidized bed reactor. In an illustrative embodiment, as may be combined with one or more of the preceding paragraphs, the particulate catalyst for use in the illustrative embodiments described herein can be a metal oxide catalyst on an oxide support. Suitable metals of the metal oxide include, for example, Na, K, Mg, Ca, Sr, Cr, Mo, Mn, Fe, Co, Ni, Cu, Zn, Al, rare earth metals, or a mixture thereof. In an illustrative embodiment, the metal oxide can be present in an amount ranging from about 0.01 to about 10 wt. %. In an illustrative embodiment, a suitable oxide support can be any suitable inorganic oxide support. Representative examples of such suitable oxide supports include, but are not limited to, alumina, silica, silica-alumina, titania, zirconia, or a mixture thereof. In one embodiment, the oxide support is one of alumina and silica-alumina where the silica content of the silica-alumina support can range from about 2 to about 30 wt. %. The alumina can be any of the aluminas conventionally used for hydroprocessing catalysts. Such aluminas are generally porous amorphous alumina having an average pore size from about 50 to about 200 angstroms. In some embodiments, the oxide supports can also be non-porous oxide materials which have been fused in an electric arc furnace. Representative examples of such non-porous oxide materials include, but are not limited to, fused silica and fused alumina.

The metal oxide catalyst may be in any of the commonly used catalyst shapes such as, for example, spheres, granules, pellets, chips, rings, extrudates, or powders that are well-known in the art.

In an illustrative embodiment, as may be combined with one or more of the preceding paragraphs, the particulate catalyst used herein is a small particulate catalyst. The term "small particulate catalyst" as used herein shall be understood to mean a catalyst having an average particle diameter of about 0.05 to about 4 millimeters (mm), or about 0.05 to about 2 mm, or about 0.06 to about 0.5 mm or even around 100 micrometers. Any of the lower limits described above can be combined with any of the upper limits.

Reactor Systems

Referring now to the drawings in more detail, FIGS. 1 and 2 illustrate a fluidized bed reactor system 100 including at least a fluidized bed reactor, a gas mixer, a catalyst regeneration unit and a riser. It is to be understood that fluidized bed reactor system 100 including at least the fluidized bed reactor, gas mixture, catalyst regeneration unit and riser are not limited to the configuration of the embodiments shown in FIGS. 1 and 2, and other configurations are contemplated herein.

Fluidized bed reactor system 100 includes a fluidized bed reactor 102 having a reactor wall 104 that defines a reaction chamber 106. In a non-limiting illustrative embodiment, fluidized bed reactor 102 may have a cylindrical configuration with a constant diameter along all or a portion of its length of reactor wall 104, which may constitute a majority of its length (see FIG. 1). In another non-limiting illustrative embodiment, fluidized bed reactor 102 may have a cylindrical configuration with a constant diameter along all or a portion of its length of reactor wall 104, which may constitute a majority of its length (see FIG. 1). In some embodiments, fluidized bed reactor 102 may have a cylindrical configuration from a top of fluidized bed reactor 102 to a bottom portion of fluidized bed reactor 102 with a uniform diameter. In a non-limiting illustrative alternative embodiment, as depicted in FIG. 2, fluidized bed reactor 102 may have a cylindrical configuration with a first portion having a first diameter, $D_1$, and a second portion having a second diameter, $D_2$, greater than the diameter of the first diameter, $D_1$. However, as one skilled in the art will appreciate, the cylindrical configurations are merely illustrative and any other suitable shape of the same or varying diameters are contemplated herein. For example, in illustrative embodiments, fluidized bed reactor 102 may have a cylindrical configuration with a top portion having a first diameter and a bottom portion of fluidized bed reactor 102 having a second diameter different than the first diameter, i.e., the first diameter may be greater than or less than the second diameter.

In illustrative embodiments, fluidized bed reactor 102 includes reactor wall 104 that surrounds the interior. In some embodiments, reactor wall 104 may be formed from a reactor lining having one or more layers of a refractory material that line the interior of reactor wall 104 to reduce heat loss and sustain the high temperatures of fluidized bed reactor 102. The reactor lining provides thermal and abrasion resistance, and may extend over all or a portion of fluidized bed reactor system 100 including at least fluidized bed reactor 102. For example, fluidized bed reactor 102 may operate at high or even extremely high temperatures, and further includes a flowing heated regenerated catalyst. These and other factors can lead to, for example, a highly corrosive environment. Also, minimizing heat losses, minimizing side wall temperatures, and maintaining a desired temperature in reaction chamber 106 can be important for operational reasons. The reactor lining is useful to address these and other considerations.

In some embodiments, the entire reactor lining, or at least significant portions of it are, continuous. As used herein, the term continuous is intended to broadly refer to a condition of being substantially free from seams or other breakages in construction. In some embodiments, the reactor lining has an interior surface that is generally parallel with reactor wall 104. In some embodiments, the reactor lining can go around the entire surface of the fluidized bed reactor system including a catalyst regeneration unit 110 as depicted in FIGS. 1 and 2. In some embodiments, the reactor lining can have a thickness which will vary with the particular application and other factors, but in many applications will be between about 1 inch and about 12 inches. In some embodiments, the reactor lining can have a thickness between about 3 inches and about 8 inches.

Suitable materials for use as the refractory material are those that provide good thermal insulation and abrasion resistance. In some embodiments, the reactor lining is castable. A wide variety of suitable refractory materials are known including, for example, standard Portland cement. As one skilled in the art will appreciate, the refractory materials can be inorganic, nonmetallic, porous and heterogeneous materials comprising thermally stable mineral aggregates, a binder phase and one or more additives. In some embodiments, the refractory material may comprise one or more of silica, alumina, calcium oxide, titanium oxide, iron oxide, magnesium oxide, zirconium and others. Different compositions can be selected for different applications, with design considerations including degree of thermal and abrasion resistance needed. Examples include higher abrasion resistant refractory materials in sections of the lining that may be subject to significant abrasion. As one skilled in the art will readily appreciate, different refractory material and its thickness may apply at different locations based on the temperature, turbulence intensity, erosion tendency, etc.

Fluidized bed reactor 102 further includes separators 108 located at the top of fluidized bed reactor 102. Separators 108 receive the product effluent stream comprising hydrogen and spent catalyst comprising coke deposits produced from cracking the heated light hydrocarbon feed stream in the presence of the heated regenerated catalyst. Separators 108 then separate a spent catalyst 112 from the product effluent stream to generate a product stream 113 comprising hydrogen which then exits fluidized bed reactor 102. Spent catalyst 112 then flows downward from separators 108 and to catalyst regeneration unit 110 through conduits 114. In some embodiments, conduits 114 can extend from the bottom portion of fluidized bed reactor 102 to a mid or lower section of catalyst regeneration unit 110 to prevent gas rising in conduits 114. Spent catalyst 112 flows downward by, for example, gravity forces.

In some embodiments, a suitable separator for use herein includes, for example, a cyclone. Although three separators are shown for separators 108 in FIG. 1 and two separators are shown for separators 108 in FIG. 2, the number of separators is merely illustrative and any number higher or lower can be used in fluidized bed reactor 102 based on such factors as, for example, reactor design, etc.

Fluidized bed reactor 102 further includes catalyst regeneration unit 110 for receiving spent catalyst 112 from separators 108 through conduits 114 which are in fluid communication with catalyst regeneration unit 110. As discussed above, coke is formed on the surface of spent catalyst 112 comprising the particulate catalyst and coke deposits, i.e., coked-catalyst particulates. Spent catalyst 112 is continuously introduced to catalyst regeneration unit 110 via conduits 114 where spent catalyst 112 is subjected to coke burning conditions to burn most, if not all, of the coke from spent catalyst 112 and provide a heated regenerated catalyst 118.

In an illustrative embodiment, catalyst regeneration unit 110 includes a regeneration gas inlet adapted to receive an oxidizing stream 116 into catalyst regeneration unit 110. The regeneration gas inlet may be disposed at the bottom of catalyst regeneration unit 110. However, this is merely illustrative and other locations for the regeneration gas inlet are contemplated herein. Catalyst regeneration unit 110 further includes a flow distributor 120 which is configured to inject oxidizing stream 116 amongst spent catalyst 112 disposed in catalyst regeneration unit 110. The coke can be burned from spent catalyst 112 by exposing spent catalyst 112 to oxidizing stream 116, e.g., an inert gas/air such as air, oxygen, nitrogen, methane, or combinations thereof or a steam/air mixture, at appropriate high temperature and time duration conditions to burn off and remove substantially all coke deposits from the catalyst. In an illustrative embodiment, a temperature can range from about 450° C. to about 1400° C., and a time period can range from about 10 minutes to about 600 minutes. Accordingly, regenerating spent catalyst 112 generally comprises combustion of spent catalyst 112 in an oxidizing atmosphere to burn the coke deposits and redisperse active metal on the catalyst particles. Burning the coke is an exothermic process that can supply the heat needed for the reaction process. In a heat balanced operation, the quantity of coke formed on the catalyst is significant enough that no external heat source or fuel is needed to supplement the heat from coke combustion.

The coke burn causes spent catalyst 112 to be heated to an elevated temperature, e.g., a temperature of from about 450° C. to about 1400° C., to provide a heated regenerated catalyst 118 relatively free or free of coke wherein the catalyst particles are heated, and a heated gas effluent 117. In some embodiments heated gas effluent 117 is regenerator flue gas composed of, for example, carbon dioxide and nitrogen. In some embodiments, heated regenerated catalyst 118 can have a temperature ranging from about 600° C. to about 1500° C. In addition, oxidizing stream 116 is used to fluidize heated regenerated catalyst 118 in catalyst regeneration unit 110 to form a hot regenerated fluidized particulate catalyst. Heated regenerated catalyst 118 is continuously introduced to the riser 126 as a hot regenerated catalyst, i.e., a regenerated catalyst is at an elevated temperature relative to the temperature of spent catalyst 112. The heat generated by the coke burn in catalyst regeneration unit 110 is continuously transferred with heated regenerated catalyst 118 to fluidized bed reactor 102 via a riser 126.

The heat generated by the coke burn in catalyst regeneration unit 110 is also continuously transferred with heated gas effluent 117 which flows upwards and is continuously passed out of catalyst regeneration unit 110 into a gas mixer 122. In some embodiments, heated gas effluent 117 can have a temperature ranging from about 600° C. to about 1500° C. Gas mixer 122 is operatively connected to catalyst regeneration unit 110. In gas mixer 122, heated gas effluent 117 is mixed with light hydrocarbon feed stream 115. Light hydrocarbon feed stream 115 can be pre-heated prior to flowing into gas mixer 122. As light hydrocarbon feed stream 115 mixes with heated gas effluent 117 in gas mixer 122, light hydrocarbon feed stream 115 is heated to produce a heated light hydrocarbon feed stream 132. In some embodiments, light hydrocarbon feed stream 115 is heated to a temperature of about 500° C. to about 1200° C., or about 600° C. to about 1200° C. Heated light hydrocarbon feed stream 132 then flows upward utilizing a flow distributor 124 to a top portion of fluidized bed reactor 102 for cracking with heated regenerated catalyst 118.

In some embodiments, fluidized bed reactor system 100 may further have one or multiple conduits between the top section of catalyst regeneration unit 110 and different locations in fluidized bed reactor 102 that allows the hot gas effluent to be transferred to different locations of fluidized bed reactor 102 to heat up fluidized bed reactor 102. In some embodiments, the one or multiple conduits can have valves to adjust the hot effluent gas flow.

Heated regenerated catalyst 118 is introduced to riser 126 where it is continuously sent to fluidized bed reactor 102 utilizing a gaseous stream 128. In some embodiment, it may be necessary to add a fresh catalyst 130 to heated regenerated catalyst 118. Thus, fresh catalyst 130 can be introduced into riser 126 to be combined with heated regenerated catalyst 118 and gaseous stream 128. In an illustrative embodiment, a top portion of riser 126 is operatively connected to a top portion of fluidized bed reactor 102 and a bottom portion of riser 126 is operatively connected to catalyst regeneration unit 110. Riser 126, is essentially a pipe, in which heated regenerated catalyst 118 can be introduced to riser 126 in the presence of gaseous stream 128 at the bottom of riser 126 in which the gas flow is sufficiently high to pneumatically transport heated regenerated catalyst 118 into fluidized bed reactor 102, where heated regenerated catalyst 118 and heated light hydrocarbon feed stream 132 are subjected to cracking to produce the product effluent stream. In some embodiments, gaseous stream 128 is a tail gas stream.

In illustrative embodiments, heated light hydrocarbon feed stream 132 and heated regenerated catalyst 118 are subjected to reaction conditions such as, for example, a temperature of from about 500° C. to about 1200° C., and for a residence time of heated light hydrocarbon feed stream 132 in fluidized bed reactor 102 of from about 0.05 seconds to about 100 seconds, or from about 0.1 seconds to about 2 seconds.

In some embodiments, fluidized bed reactor system 100 can include a pressurizer 134. In non-limiting illustrative embodiments, pressurizer 134 comprises a pressure balance line. In some embodiments, the pressure balance line is configured to enable a flow of process gas into fluidized bed reactor 102, so as to increase or decrease the pressure gradient across fluidized bed reactor 102. In some embodiments, the pressure balance line can further contain a valve to control the flow of the process gas. In some embodiments, the process gas can be a heated process gas to provide additional heat to fluidized bed reactor 102.

According to an aspect of the present disclosure, a continuous process comprises:

receiving, in a top portion of a fluidized bed reactor, a first heated light hydrocarbon feed stream flowing upwards and a first heated regenerated catalyst at a temperature sufficient to crack the first heated light hydrocarbon feed stream to produce a first product effluent stream comprising hydrogen and spent catalyst comprising coke deposits, combusting, in a catalyst regeneration unit operatively connected to a bottom portion of the fluidized bed reactor, the spent catalyst comprising the coke deposits to produce a second heated regenerated catalyst and a heated gas effluent, heating a light hydrocarbon feed stream with the heated gas effluent to produce a second heated light hydrocarbon feed stream, and flowing, in a riser externally connected to the catalyst regeneration unit and the fluidized bed reactor, the second heated regenerated catalyst from the catalyst regeneration unit with a gas-based stream to the top portion of the fluidized bed reactor to contact the second heated light hydrocarbon feed stream flowing upwards to produce a second product effluent stream comprising hydrogen and additional spent catalyst comprising coke deposits.

In one or more additional illustrative embodiments, as may be combined with the preceding paragraphs, combusting the spent catalyst comprising the coke deposits comprises contacting the spent catalyst with an oxidizing stream in the catalyst regeneration unit.

In one or more additional illustrative embodiments, as may be combined with the preceding paragraphs, the oxidizing stream is an inert gas, air or mixtures thereof.

In one or more additional illustrative embodiments, as may be combined with the preceding paragraphs, the oxidizing stream comprises a steam and air mixture.

In one or more additional illustrative embodiments, as may be combined with the preceding paragraphs, heating the light hydrocarbon feed stream with the heated gas effluent comprise flowing the light hydrocarbon feed stream and the heated gas effluent into a gas mixer to produce the second heated light hydrocarbon feed stream.

In one or more additional illustrative embodiments, as may be combined with the preceding paragraphs, the first heated light hydrocarbon feed stream and the second heated light hydrocarbon feed stream are individually at a temperature of about 500° C. to about 1200° C.

In one or more additional illustrative embodiments, as may be combined with the preceding paragraphs, the continuous process further comprises flowing the second heated light hydrocarbon feed stream upwards to the top portion of the fluidized bed reactor utilizing a flow distributor.

In one or more additional illustrative embodiments, as may be combined with the preceding paragraphs, the continuous process further comprises separating, in one or more cyclones, the spent catalyst from the first product effluent stream comprising hydrogen and the spent catalyst comprising the coke deposits, wherein the spent catalyst flows downward into the catalyst regeneration unit through one or more conduits.

In one or more additional illustrative embodiments, as may be combined with the preceding paragraphs, the light hydrocarbon feed stream comprises $C_1$ to $C_6$ alkanes. In one or more additional illustrative embodiments, as may be combined with the preceding paragraphs, the light hydrocarbon feed stream is a natural gas stream.

According to another aspect of the present disclosure, a fluidized bed reactor system comprises:

a fluidized bed reactor configured to receive a heated light hydrocarbon feed stream flowing upwards and a heated regenerated catalyst at a temperature sufficient to crack the heated light hydrocarbon feed stream to produce a product effluent stream comprising hydrogen and spent catalyst comprising coke deposits, a catalyst regeneration unit operatively connected to a bottom portion of the fluidized bed reactor, the catalyst regeneration unit being configured to receive the spent catalyst flowing downwards and combust the coke deposits to produce the heated regenerated catalyst and a heated gas effluent for generating the heated light hydrocarbon feed stream, and a riser externally attached to the fluidized bed reactor and the catalyst regeneration unit, the riser being configured to receive the heated regenerated catalyst and a gas-based stream to flow the heated regenerated catalyst upwards to the fluidized bed reactor.

In one or more additional illustrative embodiments, as may be combined with the preceding paragraphs, the fluidized bed reactor system further comprises:

a gas mixer operatively connected to the catalyst regeneration unit, the gas mixer configured to receive a light hydrocarbon feed stream and the heated gas effluent to produce the heated light hydrocarbon feed stream.

In one or more additional illustrative embodiments, as may be combined with the preceding paragraphs, a top portion of the fluidized bed reactor has a first diameter and the bottom portion of the fluidized bed reactor has second diameter different than the first diameter.

In one or more additional illustrative embodiments, as may be combined with the preceding paragraphs, the fluidized bed reactor system further comprises:

a flow distributor located above the gas mixer and configured to flow the heated light hydrocarbon feed stream upwards to the top portion of the fluidized bed reactor.

In one or more additional illustrative embodiments, as may be combined with the preceding paragraphs, the fluidized bed reactor system further comprises:

one or more cyclones located at a top portion of the fluidized bed reactor and configured to separate the spent catalyst from the product effluent stream comprising hydrogen and the spent catalyst comprising the coke deposits.

In one or more additional illustrative embodiments, as may be combined with the preceding paragraphs, the spent catalyst separated from the product effluent stream flows downward to the catalyst regeneration unit and enters the catalyst regeneration unit through one or more conduits.

In one or more additional illustrative embodiments, as may be combined with the preceding paragraphs, the catalyst regeneration unit comprises an inlet for receiving an oxidizing stream to combust the coke deposits.

In one or more additional illustrative embodiments, as may be combined with the preceding paragraphs, the fluidized bed reactor system further comprises:

a flow distributor located under the catalyst regeneration unit to flow the oxidizing stream uniformly in the catalyst regeneration unit.

In one or more additional illustrative embodiments, as may be combined with the preceding paragraphs, the fluidized bed reactor system further comprises one or more layers of a refractory material disposed on sidewalls of the fluidized bed reactor.

In one or more additional illustrative embodiments, as may be combined with the preceding paragraphs, the light hydrocarbon feed stream is a natural gas stream.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present disclosure and are disclosed herein just as if each and every such sub-combination was individually and explicitly disclosed herein.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A continuous process, comprising:

receiving, in a top portion of a fluidized bed reactor, a heated light hydrocarbon feed stream flowing upwards and a heated regenerated catalyst at a temperature sufficient to crack the heated light hydrocarbon feed stream to produce a first product effluent stream comprising hydrogen and spent catalyst comprising coke deposits;

combusting, in a catalyst regeneration unit operatively connected to a bottom portion of the fluidized bed reactor, the spent catalyst comprising the coke deposits to produce the heated regenerated catalyst and a heated gas effluent;

mixing a light hydrocarbon feed stream with the heated gas effluent to produce the heated light hydrocarbon feed stream, the mixing comprising flowing the heated gas effluent upwards in the catalyst regeneration unit to a point of injection of the light hydrocarbon feed stream above the catalyst regeneration unit where the heated gas effluent and the light hydrocarbon feed stream are mixed; and flowing, in a riser externally connected to the catalyst regeneration unit and the fluidized bed reactor, the heated regenerated catalyst from the catalyst regeneration unit with a gas-based stream to the top portion of the fluidized bed reactor to contact the heated light hydrocarbon feed stream flowing upwards to produce a second product effluent stream comprising hydrogen and additional spent catalyst comprising coke deposits.

2. The continuous process according to claim 1, wherein combusting the spent catalyst comprising the coke deposits comprises contacting the spent catalyst with an oxidizing stream in the catalyst regeneration unit.

3. The continuous process according to claim 2, wherein the oxidizing stream comprises air or a steam and air mixture.

4. The continuous process according to claim 1, wherein the light hydrocarbon feed stream and the heated gas effluent are mixed in a gas mixer.

5. The continuous process according to claim 1, wherein the heated light hydrocarbon feed stream is at a temperature of about 500° C. to about 1200° C.

6. The continuous process according to claim 1, further comprising flowing the heated light hydrocarbon feed stream upwards to the top portion of the fluidized bed reactor utilizing a flow distributor.

7. The continuous process according to claim 1, further comprising separating, in one or more cyclones, the spent catalyst from the first product effluent stream comprising hydrogen and the spent catalyst comprising the coke deposits, wherein the spent catalyst flows downward into the catalyst regeneration unit through one or more conduits.

8. The continuous process according to claim 1, wherein the light hydrocarbon feed stream comprises $C_1$ to $C_6$ alkanes.

9. The continuous process according to claim 7, wherein the separating generates a product stream comprising hydrogen that flows upward to exit the fluidized bed reactor.

10. The continuous process according to claim 1, wherein the light hydrocarbon feed stream is a natural gas stream.

11. The continuous process according to claim 1, wherein the first product effluent stream and the second product effluent stream each further comprise a $C_2$ to $C_{10}$ hydrocarbon product.

12. The continuous process according to claim 1, wherein the heated gas effluent is regenerator flue gas comprising carbon dioxide and nitrogen.

13. The continuous process according to claim 1, wherein the heated regenerated catalyst has a temperature ranging from about 600° C. to about 1500° C.

14. The continuous process according to claim 1, wherein the gas-based stream is a tail gas stream.

15. The continuous process according to claim 1, wherein the heated light hydrocarbon feed stream and the heated regenerated catalyst are subjected to reaction conditions comprising a temperature of from about 500° C. to about 1200° C., and for a residence time of the heated light hydrocarbon feed stream in the fluidized bed reactor of from about 0.05 seconds to about 100 seconds.

16. The continuous process according to claim 1, wherein the heated regenerated catalyst comprises a metal oxide catalyst on an oxide support.

17. The continuous process according to claim 16, wherein the metal of the metal oxide is one or more of Na, K, Mg, Ca, Sr, Cr, Mo, Mn, Fe, Co, Ni, Cu, Zn, Al, rare earth metals, or a mixture thereof.

18. The continuous process according to claim 17, wherein the oxide support is an inorganic oxide support.

19. The continuous process according to claim 1, wherein the combusting comprises heating the spent catalyst comprising the coke deposits.

20. The continuous process according to claim 19, wherein the heating comprises exposing the spent catalyst comprising the coke deposits to an oxidizing stream in the catalyst regeneration unit at a temperature of from about 450° C. to about 1400° C., and a time period of from about 10 minutes to about 600 minutes.

* * * * *